UNITED STATES PATENT OFFICE.

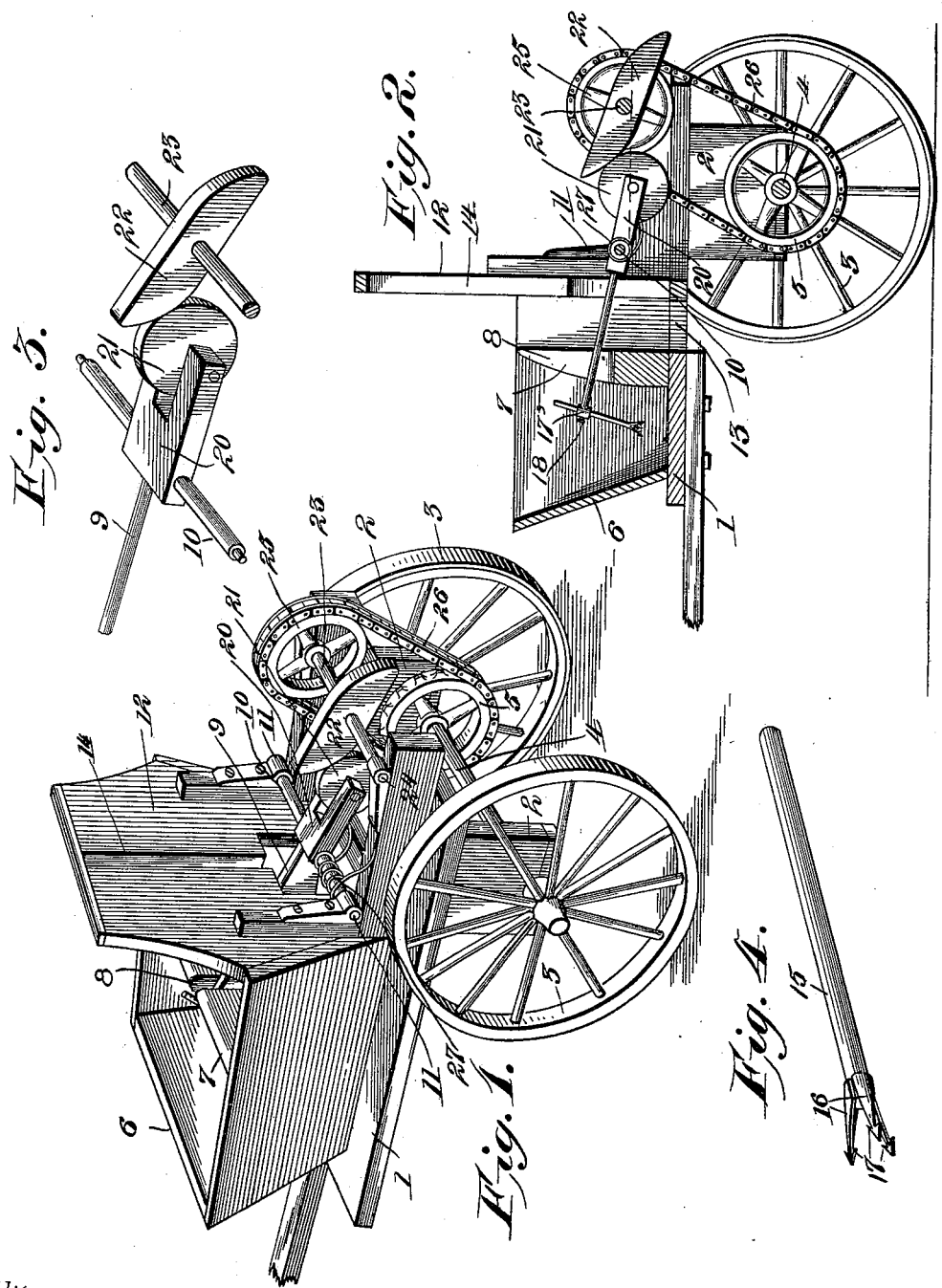

HERBERT HAID, OF BILLINGS, MONTANA.

POTATO-PLANTER.

SPECIFICATION forming part of Letters Patent No. 635,479, dated October 24, 1899.

Application filed August 23, 1899. Serial No. 728,231. (No model.)

*To all whom it may concern:*

Be it known that I, HERBERT HAID, a citizen of the United States, residing at Billings, in the county of Yellowstone and State of Montana, have invented a new and useful Potato-Planter, of which the following is a specification.

My invention relates to improvements in potato-planters, and has for its object the production of an agricultural implement of this class in which is embodied a potato-spear having a uniform movement throughout its stroke and provided with an adjustable end, by means of which the device may be accommodated to potatoes of varying sizes.

Further and subordinate objects may hereinafter more fully appear as the necessity for certain peculiarities of construction is developed in the succeeding description.

Referring to the drawings, Figure 1 is a perspective view of my planter complete. Fig. 2 is a central sectional view thereof. Fig. 3 is a detail view illustrating the relation between the oscillatory spear and its actuating-cam, and Fig. 4 is a detail view of the prong end of the spear.

Referring to the accompanying drawings, on which like numerals serve to designate corresponding parts throughout, 1 indicates the frame or platform of my planter, from which depend at its rear end a pair of axle-supports 2.

3 3 indicate the wheels of the planter, which is in general of ordinary sulky form. These wheels are keyed or otherwise rigidly mounted upon an axle or shaft 4, to which is keyed a sprocket-wheel 5, designed, in a manner to be described, to transmit power to the spear-actuating mechanism.

6 indicates the potato-hopper, of ordinary form, except that its rear wall 7 is vertically curved and is provided with a central vertical slot 8 for the reception of an oscillatory spear-carrying lever 9, projecting forwardly from a rock-shaft 10, mounted in suitable bearings 11. These bearings are preferably mounted upon what I will term the "potato-detaching plate" 12. This plate is located a slight distance in the rear of the hopper 6, and the platform 1 is provided with a feed-opening 13 between the wall 7 and the plate 12. The oscillatory spear 9 passes through a vertical slot 14 in the plate 12, located in longitudinal alinement with the slot 8 in the plate 7.

15 indicates a detachable spear extending at right angles to the spear-carrying lever and provided with a number of terminal tines 16, each of which is formed with a number of minute prongs 17. Any suitable means for adjusting the spear may be provided; but I prefer to extend it through a thimble 17', carried at the end of the lever 9 and provided with an adjustment-screw 18.

20 indicates the rear portion of the spear-lever, in the form of a block projecting rearwardly from the rock-shaft 10 and provided with a roller 21, designed to be engaged by a double cam 22, carried upon a shaft 23, journaled in suitable bearings 24 at the rear of the frame, and provided with a detachable gear-wheel 25, which is designed, through the medium of a sprocket or other band 26, to be geared to the wheel 5 upon the axle.

27 indicates a heavy spiral spring wound upon the rock-shaft 10 and having its opposite ends bearing against the lever 20 and a fixed part of the frame, the function of the spring being to urge the rock-shaft constantly in a direction to present the prong-head of the spear at the bottom of the potato-hopper.

The operation of my planter, constructed as described, is as follows: The hopper having been supplied with potatoes and the spearhead having been properly adjusted to insure its engagement with a potato at each oscillation, the planter is propelled as ordinary, and power is thus communicated through the gears 5 and 25 to rotate the cam-shaft 23. It now appears proper to note essential defects in planters of this general type, the elimination of which is the objective point of the present invention. Oscillatory spears for engaging a potato and discharging it through a feed-opening is a common expedient; but the operation of the spear by means of crank-arms, pins carried by actuating-wheels, and other devices of like nature causes the spear to be elevated with a jerk, which frequently causes the detachment of the potato before it is removed from the hopper, and, further, the potato, if still adhering to the spear, has been brought against the detaching-plate with such force as to destroy its usefulness. In order, therefore, to cause the spear to be elevated with a gradual, easy movement and to be presented before the detaching-plate without undue violence, I have devised the cam-and-roller connection described. Thus when the device is propelled as remarked the spear is successively oscillated by the contact of the cam 22 with the roller 21 and the potatoes are successively removed from the hopper and presented to the face of the detaching-plate, which as the spear is drawn back through the opening 14 causes the detachment of the potato and its gravitation through the feed-opening to the ground, the spear being returned to its normal position after each oscillation by means of the spring upon the rock-shaft.

What I claim is—

In a potato-planter, the combination with a supporting-frame, of a hopper provided with a slotted rear wall, a slotted detaching-plate behind said wall, a shaft mounted in bearings carried by said plate, a lever lying in the slots of the wall and plate and comprising a block fixed to said shaft, a longitudinal slot in the block, a roller disposed in said slot and journaled in the block, a double cam adapted for engagement with the roller to oscillate the lever, and a spear adjustably connected with the opposite end of the lever and adapted to engage potatoes in the hopper and deposit them between the back of the hopper and the detaching-plate.

In testimony that I claim the foregoing as my own I have hereto affixed my signature in the presence of two witnesses.

HERBERT HAID.

Witnesses:
T. A. WILLIAMS,
NAT. G. CARROLL.